Sept. 22, 1964 M. M. KATZ 3,149,629
THERAPEUTIC APPLIANCE
Filed Jan. 13, 1960
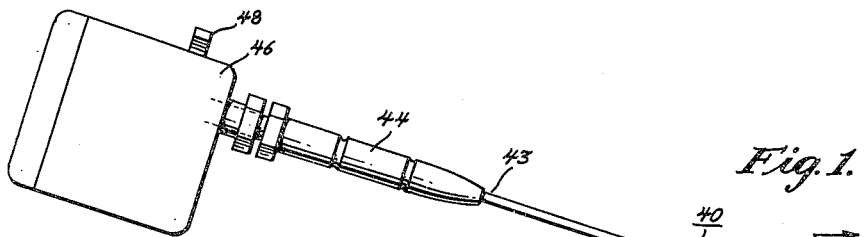
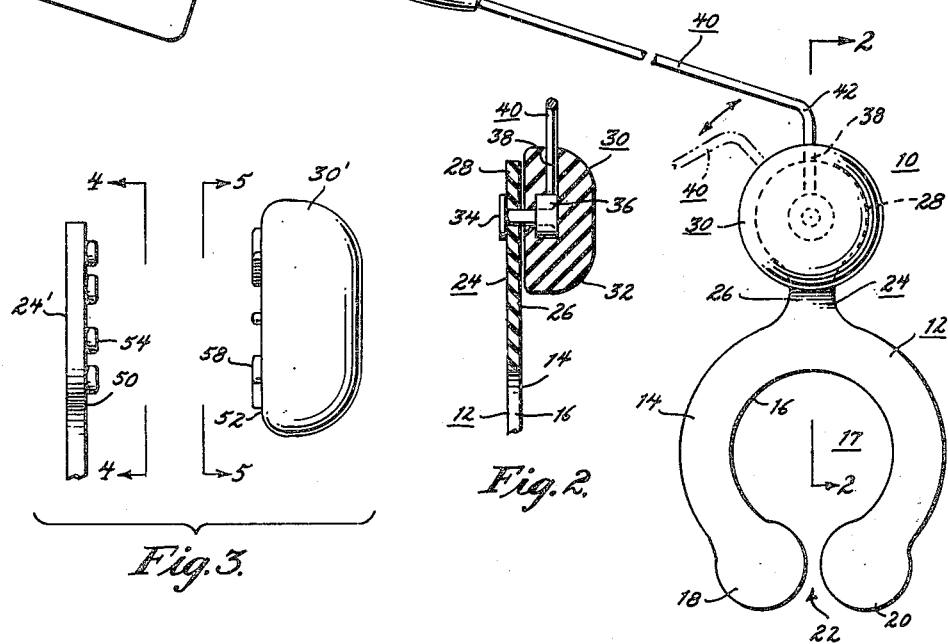
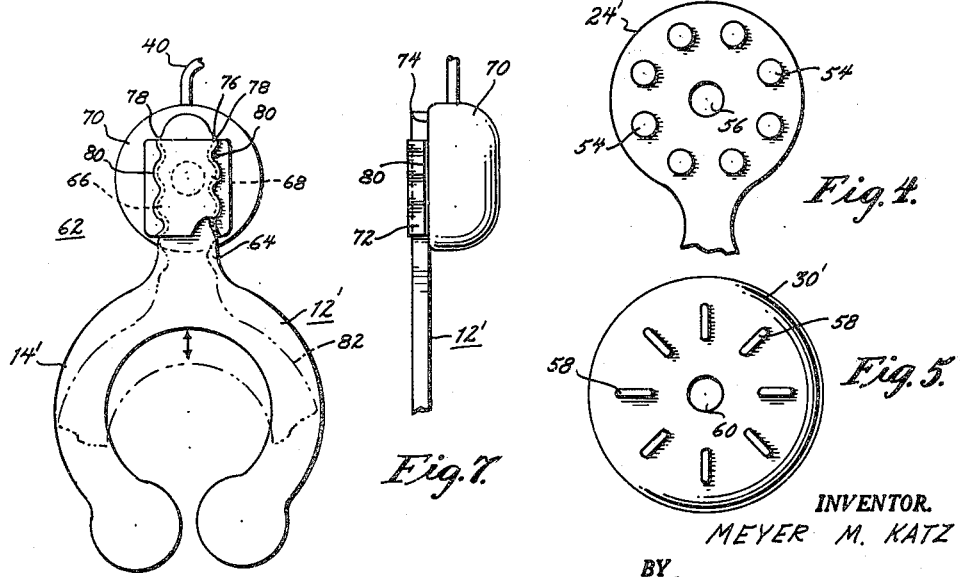
INVENTOR.
MEYER M. KATZ
BY Jacob Trachtman
ATTORNEY.

United States Patent Office 3,149,629
Patented Sept. 22, 1964

3,149,629
THERAPEUTIC APPLIANCE
Meyer M. Katz, Philadelphia, Pa.
(1107 Valley Road, Melrose Park, Pa.)
Filed Jan. 13, 1960, Ser. No. 2,247
15 Claims. (Cl. 128—44)

This invention relates to therapeutic appliances and more particularly to an appliance for massaging portions of the body not easily accessible for various reasons.

In some cases, excessive body weight beyond the limitations of skeletal and physical requirements cause deep folds in the skin, making it difficult to treat such areas. The axillary folds, inframammary area, the public area, the gluteal fold, and the lowest part of the abdominal wall near its junction with the thigh, known as the inguinal area, are example of locations normally difficult to massage by conventional methods and vibratory devices known before this disclosure.

It is the object of this invention to provide a therapeutic appliance that can be used to engage and massage such regions and other portions of the antaomy by application of pressure of varying degrees, vibration and manipulation, regardless of the lack of skill and experience of the user.

Also, it is the object of this invention to provide a therapeutic appliance that can be worn on a portion of the anatomy, for example, on one or more fingers, to perform its function without over exertion on the part of the operator.

It is another object of this invention to provide means for easily applying or removing the therapeutic appliance without difficulty to enable continuous manual massage or manipulation of the area without the use of the device. This is a very important feature of the invention. This will allow the operator to explore the area prior to applying the appliance and to remove the aforementioned appliance without removing said manipulating organ, such as the finger, from the area.

A further object of this invention is to provide a therapeutic appliance for the above mentioned purposes that will be easily adaptable to fit the natural variation in size and shape of the anatomy without any major change or adjustment of said device. Also, it is the object of this invention to provide a therapeutic appliance to be used for the purpose as aforementioned, without causing any injury or discomfort to either party.

The above, as well as other objects of the invention, are achieved by providing a therapeutic appliance comprising a member made of a resilient material having a ring-like portion provided with an open region defining an entrance to the central opening and capable of being spread apart, a connecting portion extending from the ring-like portion opposite the open region, and an actuating portion protruding from the connecting portion in the axial direction of the ring-like portion of the member. A vbrating means is provided for vibrating the actuating portion comprising a rod which is connected at one end with the actuating portion of the member and may be hand manipulated or detachably joined with an electric vibrator.

The actuating portion may be made rotatable about its axis for adjusting the position of the actuating rod. The appliance may also be modified to include means for adjusting the position of the actuating portion along its connecting portion to suit the requirements of the users.

The foregoing and other objects of the invention will become more apparent as the following detailed description of the invention is read in conjunction with the drawings, in which:

FIGURE 1 is a front elevational view of a therapeutic appliance including the invention, FIGURE 2 is a sectional view taken on the line 2—2 of FIGURE 1, FIGURE 3 is an enlarged, exploded side elevational view illustrating a modified form of the connecting portion and actuating portion of the appliance shown in FIGURE 1, FIGURE 4 is a view taken along the line 4—4 of FIGURE 3, FIGURE 5 is a view taken along the line 5—5 of FIGURE 3, FIGURE 6 is a rear elevational view with portions broken away of a modified form of the appliance shown in FIGURE 1, and FIGURE 7 is a side elevational view of a portion of the appliance shown in FIGURE 6.

Like reference numerals designate like parts throughout the several views.

The FIGURES 1 and 2 illustrate the appliance 10 embodying the invention.

The appliance 10 comprises a member 12 made of a resilient material having a substantially flat, circular positioning portion 14 with an inner edge 16 forming a central opening 17 for receiving a portion of the anatomy, such as the finger. The positioning portion 14 is provided with proximately positioned ends 18, 20, defining an entrance 22 to the central opening 17. The ends 18, 20 may have an enlarged circular form and are capable of being readily spread apart for enlarging the entrance 22 to the central opening 17.

The positioning portion 14 of the member 12 is provided with an integral connecting portion 24 which extends radially outward from the positioning portion 14 along its periphery 180° from the ends 18, 20. The connecting portion 24 may be provided with a narrowed neck region 26 and an enlarged circular end 28. An actuating portion 30 of substantially circular configuration provided with rounded circumferential edges 32 is joined with the connecting portion 24 of the member 12 by a rivet 34. The rivet 34 extends through the center of the enlarged circular end 28 of the connecting portion 24 and into a retaining washer 36 within the actuating portion 30. In this manner the actuating portion 30 which protrudes in the direction perpendicular to the plane of the positioning portion 14 is also rotatable. The actuating portion which is also made of a resilient material is, thus, mounted for rotation about its axis parallel to the axis of the ring-like positioning portion 14 of the member 12.

One end 38 of an actuating rod 40 is connected with the actuating portion 30 of the member 12. The connected end 38 extends radially from the actuating portion 30 and is bent at 42 so that the remaining portion of the rod 40 extends at an angle thereto. The other end 43 of the rod 40 may be provided with a connecting means 44 for being readily attached with a vibrating means such as an electrical vibrator 46 provided with a control "on-off" switch 48. The electrical vibrator 46 may be of the vibrating reed type for providing vibrations with a frequency of 120 cycles per second in the direction along the actuating rod 40.

In operation, when the appliance 10 is used, it is positioned about a portion of the anatomy, such as the finger, which is received through the central opening 17 of the positioning portion 14 of the member 12, while the actuating portion 30 is located proximate the area to be treated. At this time the actuating rod 40 may be manually manipulated to vibrate the actuating portion 30 of the member 12 for applying pressure and massage to the area, or the electrical vibrator 46 may be used for providing a vibratory actuation of the actuating portion 30. Since the actuating portion 30 is rotatable about its axis, the angular position of the actuating rod 40 may be adjusted for ease and convenience of operation.

Of great importance is the entrance 22 provided by the proximately positioned ends 18, 20 of the positioning portion 12 of the member 14 which may be readily spread apart. After the use of the appliance 10, this feature allows its ready removal during the massaging treatment.

The FIGURES 3, 4 and 5 disclose a connecting portion 24' and actuating portion 30' of the appliance 10 which have been modified to include detent means for adjusting the angular position of the actuating means 30'.

The surface 50 of the connecting portion 24' which is proximate the surface 52 of the actuating portion 30' is provided with a plurality of projecting circular members 54 which are equally angularly spaced from each other and equally spaced from the center 56 of the connecting portion 24'. The surface 52 of the actuating portion 30' is similarly provided with a plurality of radially directed ridges 58 which are equally angularly spaced from each other and equally spaced from the center 60 of the actuating portion 30'.

In operation, the projecting circular members 54 and the ridges 58 interdigitate for adjusting the angular position of the actuating portion 30' within a predetermined range. The limited angular movement of the actuating portion 30' allowed by the detent means provides to some degree a decoupling of the vibratory motion imparted to the actuating means 30' by the vibrating means, so that the vibration is not entirely transmitted to the positioning portion 14 of the member 12. Since the circular members 54 and ridges 58 are made of resilient material, the exertion of sufficient force will cause the actuating portion 30' to be rotated to the next detent position within which it will remain unless it is forced to assume another detent position.

FIGURES 6 and 7 disclose a therapeutic appliance 62 which is a modified form of the appliance 10 having a member 12' including a positioning portion 14' and a connecting portion 64. The appliance 62 differs from the device 10 in that its connecting portion 64 is provided with undulating edges 66, 68 extending along the radial direction. The actuating portion 70 is provided with a bracket 72 connected to its rear surface 74 and having an opening 76 for receiving the connecting portion 64 of the member 12'. The inside surfaces 78 of the sides 80 of the bracket 72 are also of undulating configuration conforming with the undulating edges 66, 68 of the connecting portion 64. This arrangement provides a detent means for positioning the actuating portion 70 along the the connecting portion 64 in the radial direction. Since the connecting portion 64 is made of a resilient material, if sufficient force is applied, the actuating portion 70 will be moved to its next detent position. The dashed lines at 82 illustrate the relative positions of the positioning portion 14' and the actuating portion 70 of the appliance 62, when the actuating portion 70 is moved in the positive radial direction to its next position along its connecting portion 64. Thus, the position of the actuating portion 70 may be adjusted to conform with the physical requirements of the particular parties utilizing the therapeutic appliance 62.

It will, of course, be understood that the description and drawings herein contained are illustrative, and that various modifications and changes may be made in the structure disclosed without departing from the spirit of the invention.

What is claimed is:

1. A therapeutic appliance of the class described comprising a member made of a resilient material having a flat substantially circular appliance positioning portion providing a central opening for receiving a portion of the anatomy and an actuating portion connected for relative movement with respect to said positioning portion for contacting the area to be treated, said circular positioning portion having ends defining an entrance to said central opening; and rod means connected with the actuating portion of said member and having an extending end for controlling the position of the actuating portion of said member with respect to the area to be treated.

2. A therapeutic appliance of the class described comprising a member made of a resilient material having a substantially circular positioning portion providing a central opening for receiving a portion of the anatomy and an actuating portion connected for relative movement with respect to said positioning portion, said circular positioning portion having proximately positioned ends capable of being spread apart defining an entrance to said central opening, said actuating portion protruding from said positioning portion for contacting the area to be treated and elongated rod means having a first end connected with the actuating portion of said member and a second end for controlling the position of said actuating portion of said member with respect to the area to be treated.

3. A therapeutic appliance of the class described comprising a member made of a resilient material having a ring-like portion provided with an open region defining an entrance to the central opening and capable of being spread apart for receiving therethrough a portion of the anatomy, a portion extending from said ring-like portion opposite said open region, and an actuating portion for contacting the area to be treated connected for relative movement with respect to said positioning portion protruding from said extending portion in the axial direction of said ring-like portion of said member; and elongated rod means having a first end connected with the actuating portion of said member and a second end for controlling the position of said actuating portion of said member with respect to the area to be treated.

4. The appliance of claim 3 including vibrating means connected with said second end of said rod means for vibrating the actuating portion of said member.

5. The appliance of claim 3 in which said actuating portion of said member is connected with said extending portion for rotation about an axis parallel to the axial direction of said ring-like portion of said member.

6. The appliance of claim 5 including vibrating means connected with the second end of said elongated rod means.

7. A therapeutic appliance of the class described comprising a member having a positioning portion for engaging a portion of the anatomy and an actuating portion connected for relative movement with respect to said positioning portion for contacting the area to be treated, and elongated rod means having a first end connected with the actuating portion of said member and a second extending end for vibrating the actuating portion of said member for massaging the area to be treated.

8. A therapeutic appliance of the class described comprising a member made of a resilient material having an arcuate portion for engaging a portion of the anatomy and an actuating portion connected for relative movement with respect to and protruding from said arcuate portion for contacting the area to be treated, and elongated rod means having a first end connected with the actuating portion of said member and a second end for being actuated for vibrating the actuating portion of said member for massaging the area to be treated.

9. A therapeutic appliance of the class described comprising a member made of a resilient material having a substantially circular positioning portion providing a central opening for receiving a portion of the anatomy and an actuating portion connected for relative movement with respect to said positioning portion for contacting the area to be treated, elongated rod means having a first end connected with the actuating portion of said member and a second end, and means connected with the second end of said rod means for vibrating the actuating portion of said member for massaging the area to be treated.

10. A therapeutic appliance of the class described comprising a member made of a resilient material having a ring-like portion for receiving a portion of the anatomy, a connecting portion extending radially outward from said ring-like portion, and an actuating portion resiliently secured with for providing vibratory isolation and protruding from said connecting portion in the axial direction of said ring-like portion of said member, and elongated rod means having a first end connected with the actuating portion of said member and a second end for being actuated for vibrating the actuating portion of said member for massaging the area to be treated, whereas the resilient securing of said actuating portion with said connecting portion of said member minimizes transmission of vibrations to said ring-like portion and the portion of the anatomy received therein.

11. The appliance of claim 10 including vibrating means connected with the second end of said rod means for transmitting vibratory actuation to the actuating portion of said member.

12. The appliance of claim 10 in which said actuating portion of said member is mounted on said connecting portion for rotation about an axis parallel to the axial direction of said ring-like portion of said member.

13. The appliance of claim 12 in which the proximate surfaces of said actuating portion and said connecting portion are provided with detent means for adjusting the angular position of said actuating portion of said member.

14. The appliance of claim 12 including an electrical vibrator connected with the second end of said rod means.

15. A therapeutic appliance of the class described comprising a member made of a resilient material having a ring-like portion for receiving a portion of the anatomy therein, a connecting portion extending radially outward from said ring-like portion and providing undulating detent means along its length, and an actuating portion protruding in the axial direction of said ring-like portion of said member movably engaging said detent means for vibratory isolation and being positionable by said detent means by sliding along said connecting portion for adjusting its distance from said ring-like portion; and elongated rod means having a first end connected with the actuating portion of said member and a second end for being actuated for vibrating the actuating portion of said member.

References Cited in the file of this patent

UNITED STATES PATENTS

| 818,618 | Fraley | Apr. 24, 1906 |
| 949,550 | Sabatino | Feb. 15, 1910 |
| 1,106,893 | Sabatino | Aug. 11, 1914 |
| 1,346,463 | Renois | July 13, 1920 |
| 1,690,926 | Dequer | Nov. 6, 1928 |
| 2,024,983 | Street | Dec. 17, 1935 |

FOREIGN PATENTS

| 1,050,960 | Germany | Feb. 19, 1959 |